Dec. 26, 1961  J. U. MORRIS  3,014,490
FLUID CONTROL SYSTEM AND APPARATUS
Filed Dec. 26, 1957  2 Sheets-Sheet 1

INVENTOR.
JOHN U. MORRIS
BY
ATTORNEYS

Dec. 26, 1961  J. U. MORRIS  3,014,490
FLUID CONTROL SYSTEM AND APPARATUS
Filed Dec. 26, 1957  2 Sheets-Sheet 2

INVENTOR.
JOHN U. MORRIS
BY
ATTORNEYS

United States Patent Office 3,014,490
Patented Dec. 26, 1961

3,014,490
FLUID CONTROL SYSTEM AND APPARATUS
John U. Morris, Franklin Ave., Oswego, N.Y.
Filed Dec. 26, 1957, Ser. No. 705,201
11 Claims. (Cl. 137—98)

This invention relates to systems and the construction of devices for controlling the flow of fluids of various kinds, particularly fluids under pressure.

In automatic plant operations involving a plurality of separate pieces of equipment, it is frequently desirable that both the operation and supply of power or proportion of load applied to individual units of equipment be based on some particular control factor, such as the flow or pressure of fluid in a fluid supply line. Heretofore automatic controls for this purpose have been extremely complex, often requiring thousands of feet of control tubing, as well as separate control units, in even the simplest of control applications.

In general, it is an object of the present invention to provide a greatly simplified control or apportioning system by which a plurality of independent units of equipment can each be made capable of selective and independent actuation in response to a fluid control factor, and particularly in response to the supply and waste of pressure in a control line.

It is another object of the invention to provide such a control system in which the proportion of load carried by each unit of equipment varies in accordance with the variations of pressure in the control line.

It is another object of the invention to improve upon the construction of flow control apparatus for use in such control systems, and particularly upon the construction of valve means capable of operation at a predetermined pressure to actuate controls for a particular unit.

Figure 1:
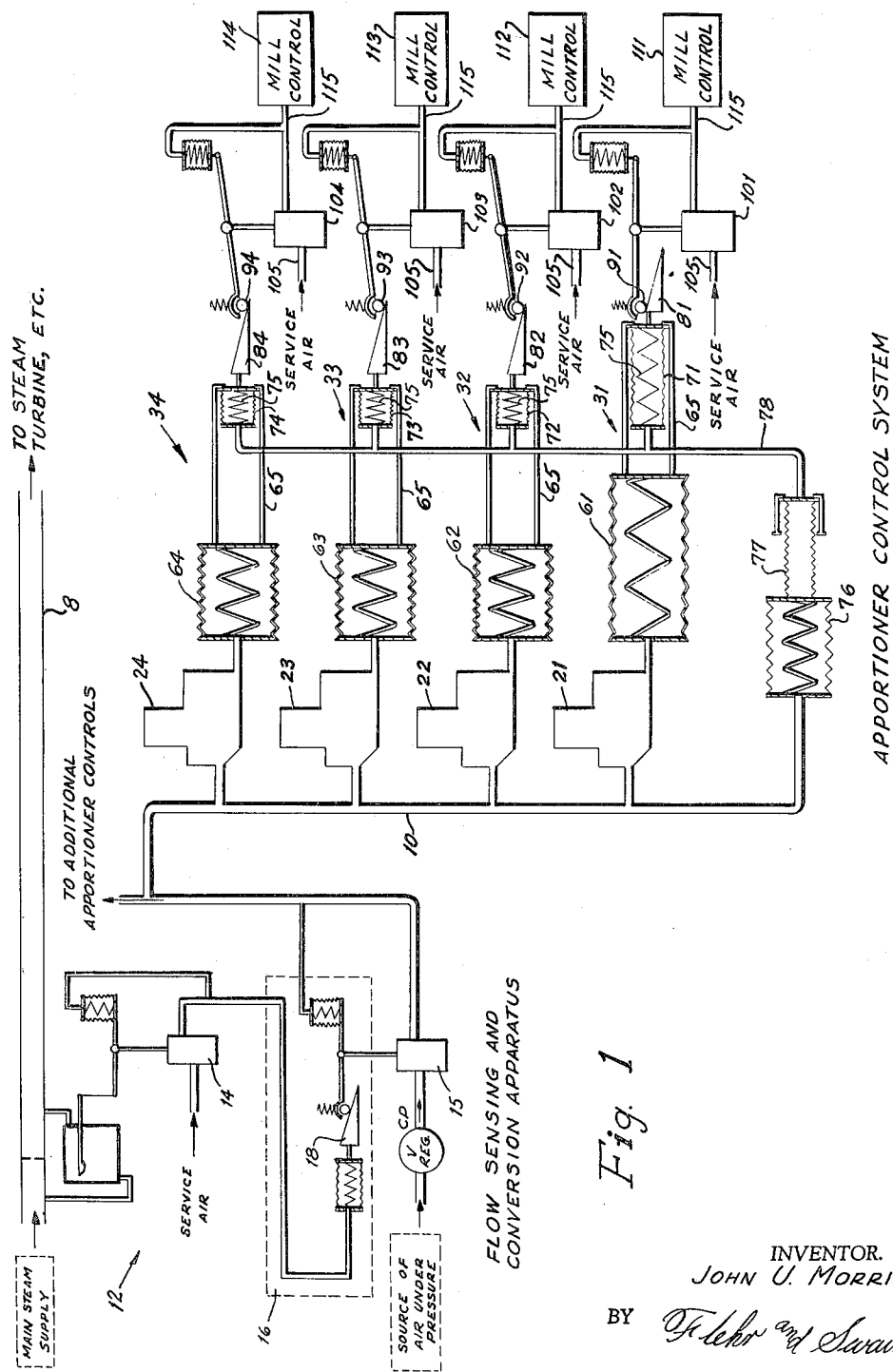
Figure 2:
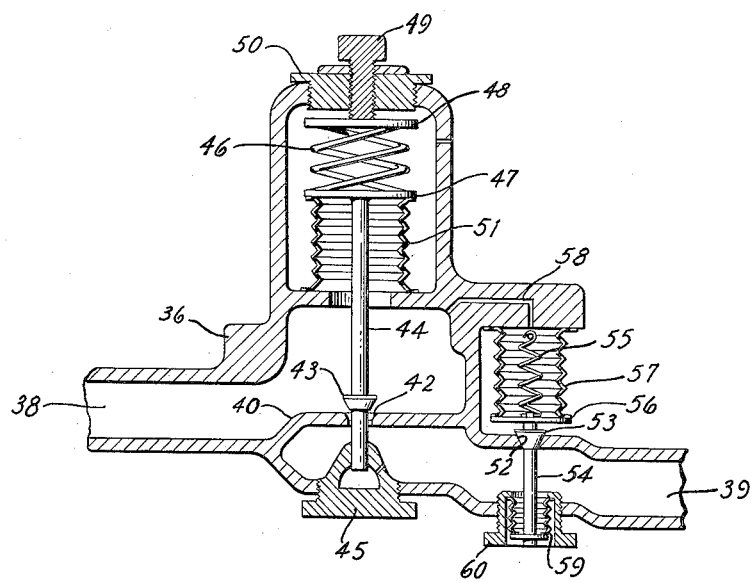

Additional objects and advantages of the invention will appear from the following description and from the drawings, in which:

FIGURE 1 is a schematic representation of a control system employing my new pressure responsive valve construction, and incorporating the principles of the invention; and FIGURE 2 is a view in section and in elevation of a particular improved valve construction, useful in the system of FIGURE 1.

Generally stated, the present invention relates to a valve construction and to a system for controlling equipment automatically in response to varying fluid pressure in a control line. More specifically, the invention has to do with an apportioning control system in which there is a master control line subject to varying pneumatic pressure (for example, in accordance with a control factor such as the flow of steam or water in a main supply line) and to the use of a plurality of valve constructions in such system, each responsive to pressure in a specific predetermined range. Through use of the system, it is possible to control a plurality of auxiliary control systems or units of equipment by the supply and waste of pneumatic pressure in the master control line.

In the exemplary system illustrated in FIGURE 1, control is based on the flow of fluid, for example, steam, in a main supply line 8. Pneumatic pressure in the master control line 10 can be made to vary in accordance with the flow of fluid in line 8 by any suitable means, such as that indicated schematically at 12. Preferably, the means 12 includes pilot valves 14 and 15 with the customary feed back and a pressure amplifying relay and characterizer 16. The purpose of the latter device is to provide amplified control pressures in the control line 10; it also permits variations in control pressure in accordance with the shape of the inclined plane 18, as will be presently explained.

As illustrated, the master control line 10 is in communication with a series of pressure responsive valve means 21 to 24, each capable of actuating a corresponding auxiliary control system 31 to 34. In general, each of the pressure responsive valve means 21 to 24 will be responsive to pressures in a specific range of pressure different from that of the other, so that each of the associated auxiliary controls 31 to 34 will be independently actuated. It will be understood however that in certain applications, two or more of the valve means 21 to 24 might advantageously be regulated to operate in substantially the same range of control pressures.

The pressure responsive valve means which I use for automatically actuating the auxiliary controls is illustrated in FIGURE 2, and includes a body 36 having a main flow passage separated into an inlet flow passage 38 and an outlet flow passage 39 by means of a partition 40. The partition 40 is provided with a flow port 42 which can be closed by the valve 43, the latter being movable with the valve stem 44. As illustrated, the valve stem can be maintained in alinement with the flow port by any suitable means such as the cylindrical bore in plug 45.

The valve 43 is normally urged into closed position by spring means 46 retained within the flanged discs 47 and 48 secured to the valve stem 44 and nut 49 respectively. The compression of the spring 46 can be regulated by adjustment of the nut 49 relative to the upper valve plug 50. It is a feature of the described valve construction that means responsive to pressure in a direction opposed to the spring 46 be provided to open the flow port 42. In the illustrated apparatus, such means includes the bellows 51 which cooperate with the spring retaining disc 47. It will be understood that when the pressure in the inlet passage 38 increases to a value greater than that exerted by the spring 46, the bellows 51 will expand with movement of the disc 47 causing the valve 43 to open.

Each of the pressure responsive valve means is also provided with a vent 52 in the outlet passage. The vent 52 is normally open to the atmosphere but can be closed by the valve 53 carried by the valve stem 54. The valve 53 is normally held in open position by the spring 55 secured between the valve body and the disc 56. Closure of the vent is accomplished by the pressure of fluid within the bellows 57 produced by flow through the conduit 58. At its lower end the valve stem 54 is preferably provided with a bellows 59, mounted in the plug 60, which is of greater effective area than the valve 53. The bellows 59 functions to hold the vent in closed position at the operating pressures of a valve construction, as will be presently explained.

Operation of a pressure responsive valve means 21 to 24 can be described as follows: Assume that the pressure in the inlet passage 38 is such that the valve 43 is normally closed and the vent 53 is normally open. As the pressure in the inlet passage rises to within the operating range of the valve means, the vent valve 53 closes due to transmission of pressure through the conduit 58, to the bellows 57. Further rise in the inlet pressure causes the pressure within bellows 51 to overcome the pressure of spring 46 and thereby open the valve 43. Control pressure from line 10 is now caused to flow through the valve means to its associated auxiliary control system. Under these operating conditions the larger effective area of the bellows 59 maintains the vent valve 53 in closed position.

Referring again to FIGURE 1, it will be observed that each of the pressure responsive valve means 21, 22, 23, and 24 has its outlet passage in communication with a corresponding auxiliary control system in the series 31 to 34. When the pressure in control line 10 increases to the operating level of a valve means, for example valve 21, control pressure is caused to flow into the bellows 61 to overcome the pressure of the spring normally holding the bellows in collapsed position. The effect of expansion of the bellows 61 is to slide the associated bellows retaining member 65 to a position allowing expansion of the smaller bellows 71. It will be understood that each of the bellows 71, 72, 73, and 74 is held against expansion by a retaining member 65 as well as by an internal spring 75.

As a means to actuate the bellows 71 to 74 there is provided an apportioning bellows combination 76, 77, which is responsive to pressure in the control line 10. The function of this bellows combination is to permit pressure from the master control line to compress the bellows 77 (by expansion of the bellows 76) and thereby to exert pressure in the closed liquid line 78 leading to the bellows 71, 72, 73, and 74. In the illustrated position of the apparatus, bellows 72, 73, and 74 are incapable of being expanded because of the retracted positions of the bellows retaining members 65. However, bellows 71 is capable of expanding because of the projected position of its retaining member due to actuation of the valve 21. It will be understood that this arrangement permits actuation of various ones of the bellows 71 to 74 in response to fluid pressure in the master line 10 as determined by prior actuation of the pressure responsive valves 21 to 24.

Expansion or contraction of the bellows 71 to 74 has the associated effect of sliding the inclined planes 81 to 84 in and out in response to the pressure in the closed pressure line 78. Inasmuch as this pressure is proportional to the pressure in line 10, the movement of the followers 91 to 94 is likewise proportional to the pressure in line 10.

Similarly the pressure signal relayed through the pilot valves 101 to 104 will be related to the master control pressure. In other words, the control pressure admitted to each pilot valve through the supply conduits 105, and passing to an associated controller or unit of equipment in the series 111 to 114, will be directly related to the master control line pressure as determined by the inclines 81 to 84.

So far the description has related principally to the effect of increase of pressure in the control line 10, in bringing into operation additional units of equipment. It will be understood, however, that a reverse effect occurs with a decrease of pressure in the master control line. Thus, referring again to FIGURE 2, a decrease of pressure in the inlet passage 38 below the pressure exerted by spring 46 will cause the valve 43 to return to a closed position. A further decrease in pressure in the inlet passage will eventually cause the spring 55 to move the valve 53 upward to open the vent 52. Assuming the conditions of FIGURE 1, the opening of vent 52 will cause the bellows 61 to collapse and the incline 31 to retract, closing the pilot valve 101. It will be appreciated however that the lower pressure level of response of the vent bellows 57 (as related to the main valve bellows 51) acts to prevent leakage from the valve means 21 at pressures which are only slightly below the operating pressure of the valve means. In other words, although the pressure responsive valves 21 to 24 can be actuated only by a pressure increase to the specified operating pressure of a valve, they will not operate to de-energize a working unit of equipment until the control pressure has dropped to a specific cut-out point, as determined by the bellows 57. Each of the pressure responsive valves can therefore be adjusted to maintain control pressures over a relatively wide range of pressures in line 10.

The units 111 to 114 can be any type of apparatus capable of response to control pressure exerted through the lines 115. By way of example, the units 111 to 114 might each be unit controls for grinding mills and primary air supplying coal to a main boiler unit, as in a plant operation involving the generation of electric power from steam. In such an operation, the flow of steam to the turbine in line 8 would produce control pressures at the mill units directly reflecting generator load requirements. Control signals to other drive or control units could also be made to depend on the pressure in the lines 115; for example, the operation of forced and induced draft fans, boiler feed controls, heater level controllers, etc. It will of course be understood that the present invention is not limited to any particular operation, or particular type of equipment, the dominant factor being the control of each unit of equipment in relation to work load requirements, as sensed in line 8.

An operational feature of the apportioning system described above is that it permits the load on a main unit to be evenly distributed over as many auxiliary units of supply (one or several) as are required by a particular load condition, again as sensed by the supply line 8. By a proper regulation of pressure response of the valve means 21 to 24, each auxiliary unit of equipment can be cut into or out of operation, individually, or in unison with one or more of the other units of equipment. Assuming a progressive response of the valves 21 to 24, with each valve operating in a range of pressures different from the others, variations of control pressure within the range of an operating valve means will produce corresponding variations in the load applied to its auxiliary unit. For example, in FIGURE 1, variations in the master control pressure in line 10 produce corresponding variations in the control signal to the unit 111, as determined by the incline 81. This control effect is due to the pressure response of the closed liquid pressure system in line 78. If two valve means, for example valves 21 and 22, are adapted to operate in the same pressure range, pressure variations in the master line 10 will produce a corresponding movement of each of the inclined planes 81 and 82, but the movement will be only one-half the previous movement, permitting each of the mills 111 and 112 to assume its share of the total load. If three of the valves 21 to 24 are set to operate in the same pressure range, the control pressure to each of the three mill units being controlled will be one-third the total in line 78 so that each operating mill will advance one-third of the required coal. Obviously, any combination of mill units can be regulated to operate in this manner, since the total movement of the bellows 71 to 74 must correspond to the total movement of the bellows 77, in the system as illustrated.

Those skilled in this art will understand that the inclined plane 18, or the planes 81 to 84, can also be particularly shaped to take into consideration unit efficiencies at different loads. Thus the angle (or curve) of the inclined plane 18 can be so cut that the control pressure in line 10 will be directly proportional to the unit coal rate as sensed by the pressure amplifying relay and characterizer 16. In like fashion the angle (or curve) of the inclines 81 to 84 can be similarly determined, for example to provide a "cosine" relationship depending upon the instantaneous angle of inclination as compared to the "square root" relationship inherent in conventional flow meters. The control system and apparatus of the present invention therefore permit a wide range of usefulness and adaptability to different types of operation.

Operation of the entire control system in carrying out the invention can now be briefly summarized as follows: the pressure responsive valve means 21, 22, 23, and 24 can be actuated either individually or in combination, as desired, in response to an increase or decrease in the load on the main unit as signalled by an increase or decrease in pressure in the master control line 10. As previously indicated, the valve means 21 is shown in open position and actuating the auxiliary control system 31 for the unit 111. Assuming individual actuation at different pressure ranges, an increase in pressure in the master control line 10 will cause one or more of the remaining valves 22, 23, and 24 to open, at pressures depending upon the regulation of pressure response by the adjusting nuts 49. Upon a decrease in pressure in the line 10, the valves can likewise be caused to close, as the control pressure drops below the operating level of each valve as determined by the springs 55. The function of the inclined planes 81 to 84 in a particular control operation is to provide travel curves that correspond to test conditions, and which are proportional to unit efficiencies at the load on the controlled device. In other words, the control pressure transmitted by a pilot valve, for example valve 101 in FIGURE 1, preferably corresponds to values predetermined for the actual load conditions being imposed on the mill unit 111, the same being true for the other units of equipment and auxiliary control systems.

To those skilled in the art to which this invention relates, it will be apparent that many changes in construction and widely differing embodiments and applications of the invention will suggest themselves without departing from the spirit and scope of the invention. The disclosures and descriptions herein are purely illustrative and are not intended to be in any sense limiting.

I claim:

1. In a system including a control line subject to varying fluid pressure, means to selectively and independently actuate a plurality of devices in response to the supply and waste of pressure in said control line, said means comprising a series of valve means in fluid communication with said control line, each such valve means including a body having flow passages therethrough, a partition separating inlet and outlet flow passages of said valve means, said partition having a flow port, first means responsive to a predetermined pressure in said inlet passage including a valve biased to close said port, a vent port in said outlet flow passage, a second means responsive to pressure in said inlet passage less than said predetermined pressure including a valve adapted to close said vent port but normally open, and conduit means in fluid communication with said inlet passage and said second pressure responsive means, whereby an increase of fluid pressure within the operating pressure range of each said valve means will first close its vent port and at the higher predetermined level will open its flow port.

2. The control system of claim 1 wherein means are provided to vary the fluid pressure in said control line in accordance with a control factor such as the flow of fluid in a main fluid supply line.

3. In a control system wherein a control line is subject to varying fluid pressure in accordance with the flow of fluid in a main fluid supply line, means to selectively and independently actuate auxiliary control systems, each said system controlling an independent unit of equipment, said means comprising a series of valve means responsive to pressure in a predetermined range, each such valve means being in fluid communication with said control line and including a body having an inlet and an outlet flow passage therethrough, a port obstructing the flow of fluid through said valve means, first pressure responsive means biased to close said port, a vent in said outlet flow passage, second pressure responsive means adapted to close said vent but biased to open same, the second means being responsive to a lower pressure than the first means, and associated conduit means connecting each of said valve means to one of said auxiliary controls, whereby an increase in fluid pressure in said control line within the pressure range of each said valve means will first act to close said vent and then to open said port and thereby to actuate said associated unit of equipment.

4. The control system of claim 3 wherein each of said valve means are provided with additional pressure responsive means to ensure closure of said vents at the operating pressure of the valve means, said additional means being responsive to pressures somewhat higher than the pressure to which said second means is responsive.

5. In a fluid control system adapted to the control of a plurality of devices, a main fluid supply line, a control line, means to vary the pressure in said control line in accordance with a control factor such as the flow of fluid in said main fluid supply line, a plurality of auxiliary control systems in communication with said control line, each such auxiliary control system adapted to selectively transmit a pressure control signal to a controlled device, and means to selectively and independently actuate said auxiliary control systems in response to supply and waste of pneumatic pressure in said control line, said actuating means comprising a series of pressure responsive valve means each in communication with said control line, each such valve means including a vent and a flow port, and pressure responsive means operable in succession to close said vent and open said flow port in response to increase of pressure within said control line.

6. In a fluid control system adapted to the control of a plurality of devices, a main fluid supply line, a pneumatic control line, means to vary the pneumatic pressure in said control line in accordance with a control factor such as the flow of fluid in said main fluid supply line, a closed liquid control line subject to pressure variations in said pneumatic control line, said liquid control line being in fluid pressure communication with a series of pilot valves, a plurality of auxiliary control systems, each including valve means in communication with said control line and with said closed liquid control line, each such valve means including pressure responsive means operable to open and close a flow port therein in response to increase and decrease of pressure within said pneumatic control line, thereby to permit a change in volume of said closed liquid control line, whereby a pressure actuation of a pressure responsive valve means will cause a corresponding actuation of an associated pilot valve.

7. In a fluid control system adapted to the control of a plurality of devices, a main fluid supply line, a pneumatic control line, means to vary the pneumatic pressure in said control line in accordance with the flow of fluid in said main supply line, a closed liquid control line, bellows means for transmitting the pneumatic pressure of said control line to said closed liquid line, pilot valves adapted to transmit a pressure control signal from said closed liquid line to a controlled device, means normally restraining actuation of said pilot valves, and means to selectively and independently actuate said pilot valves by actuation of said restraining means, said actuating means comprising a series of valve means in communication with and responsive to supply and waste of pneumatic pressure in said control line, each such valve means including a vent and a flow port, and pressure responsive means operable in succession to close said vent and open said flow port in response to increase of pressure within said control line, and to open said flow port and to open said vent in response to decrease of pressure within said control line, whereby actuation of a pressure responsive valve means will actuate a restraining means to permit opening and closing of a pilot valve.

8. A pressure responsive valve construction, adapted for use in a control system employing a control line subject to varying fluid pressure, including in combination: a body having flow passages therethrough, a partition separating inlet and outlet flow passages of said body, said partition having a flow port, a first means responsive to a predetermined pressure in said inlet passage normally closing said port, a vent port in said outlet flow passage, a second means responsive to a lower pressure in said inlet passage than said first pressure responsive means adapted to close said vent port but biased in open position, and conduit means in fluid communication with said inlet passage and said second pressure responsive means, whereby one level of fluid pressure in the inlet passage of valve means functions to open and close said vent port and a second higher level of fluid pressure in said inlet passage functions to open and close said flow port.

9. A pressure responsive valve construction, adapted for use in a control system employing a control line subject to varying pneumatic pressure, including in combination: a body having flow passages therethrough, a partition separating inlet and outlet flow passages of said body, said partition having a flow port, a first valve adapted to obstruct the flow of fluid through said port, means urging said first valve into a port closing position with a first predetermined pressure, a vent in said outlet flow passage, a second valve adapted to obstruct the flow of fluid through said vent, means urging said second valve away from said vent with a second predetermined pressure lower than said first pressure, and conduit means in fluid communication with the inlet passage and said last named valve means, whereby increasing pneumatic pressure within the operating range of the valve construction will first close the vent and then open the flow port, whereas decreasing pneumatic pressure will first close the flow port and then open the vent.

10. A pressure responsive valve construction, adapted for use in a control system employing a control line subject to varying pneumatic pressure, including in combination: a body having a flow passage therethrough, a partition separating said flow passage into an inlet passage and an outlet passage, said partition having a flow port, a valve adapted to close said port, spring means urging said valve into closed position, first means responsive to pressure in said inlet passage in a direction opposed to said spring means and adapted to open said port valve, a vent in said outlet passage, a valve adapted to close said vent, spring means urging said vent valve into open position, second means responsive to a pressure in said inlet passage lower than and adapted to close said vent valve, fluid conduit means leading from said inlet passage to said second means, whereby increasing pneumatic pressure within the operating range of the valve construction will first close the vent and then open the flow port, whereas decreasing pneumatic pressure will first close the flow port and then open the vent.

11. A pressure responsive valve construction, adapted for use in a control system employing a control line subject to varying pneumatic pressure, including in combination: a body having a flow passage therethrough, a partition separating said flow passage into an inlet passage and an outlet passage, said partition having a flow port, a valve adapted to close said port, spring means normally urging said valve into closed position, first means responsive to pressure in said inlet passage in a direction opposed to said spring means and adapted to open said port valve, a vent in said outlet passage, a valve adapted to close said vent, spring means normally urging said vent valve into open position, second means responsive to a pressure in said inlet passage lower than said first means and adapted to close said vent valve, fluid conduit means leading from said inlet passage to said second means, and additional pressure responsive means to maintain said second valve in closed position at operating pressures of said first valve whereby increasing pneumatic pressure within the operating range of the valve construction will first close the vent and then open the flow port, whereas decreasing pneumatic pressure will first close the flow port and then open the vent.

References Cited in the file of this patent

UNITED STATES PATENTS

| | | |
|---|---|---|
| 1,726,102 | Forman | Aug. 27, 1929 |
| 1,897,432 | Klotzman | Feb. 14, 1933 |
| 2,643,739 | Tear | June 30, 1953 |
| 2,791,228 | Carr et al. | May 7, 1957 |
| 2,814,180 | Hession | Nov. 26, 1957 |

FOREIGN PATENTS

| | | |
|---|---|---|
| 440,728 | Great Britain | Jan. 6, 1936 |